(12) United States Patent
Mills et al.

(10) Patent No.: US 6,813,401 B1
(45) Date of Patent: Nov. 2, 2004

(54) FABRICATION OF FABRY-PEROT POLYMER FILM SENSING INTERFEROMETERS

(75) Inventors: Timothy Noel Mills, London (GB); Paul Beard, London (GB); David Delpy, London (GB)

(73) Assignee: University College London, London (GB)

( * ) Notice: Subject to any disclaimer, the term of this patent is extended or adjusted under 35 U.S.C. 154(b) by 166 days.

(21) Appl. No.: 10/069,422

(22) PCT Filed: Aug. 18, 2000

(86) PCT No.: PCT/GB00/03238

§ 371 (c)(1),
(2), (4) Date: Jun. 11, 2002

(87) PCT Pub. No.: WO01/14824

PCT Pub. Date: Mar. 1, 2001

(30) Foreign Application Priority Data

Aug. 19, 1999 (GB) .............................................. 9919688

(51) Int. Cl.[7] .............................. G02B 6/00; B05D 5/06
(52) U.S. Cl. ........................... 385/12; 427/162; 427/487
(58) Field of Search ..................... 385/12, 13; 367/149; 427/487, 162

(56) References Cited

U.S. PATENT DOCUMENTS 5,311,485 A * 5/1994 Kuzmenko et al. ......... 367/149

* cited by examiner

*Primary Examiner*—Frank G. Font
*Assistant Examiner*—Michael P. Mooney
(74) *Attorney, Agent, or Firm*—Barnes & Thornburg LLP

(57) ABSTRACT

A method of forming an interferometer film for an interferometer sensor comprises forming a parylene polymer layer (8) of substantially uniform thickness directly on an interferometer substrate (4;45), the layer forming the interferometer film. Since the interferometer film (8) formed directly onto the surface of the interferometer substrate, there is improved conformity between the two surfaces at the interface between the polymer layer and the substrate and improved uniformity in the thickness of the film.

10 Claims, 2 Drawing Sheets

FABRICATION OF FABRY-PEROT POLYMER FILM SENSING INTERFEROMETERS

Figure 1:
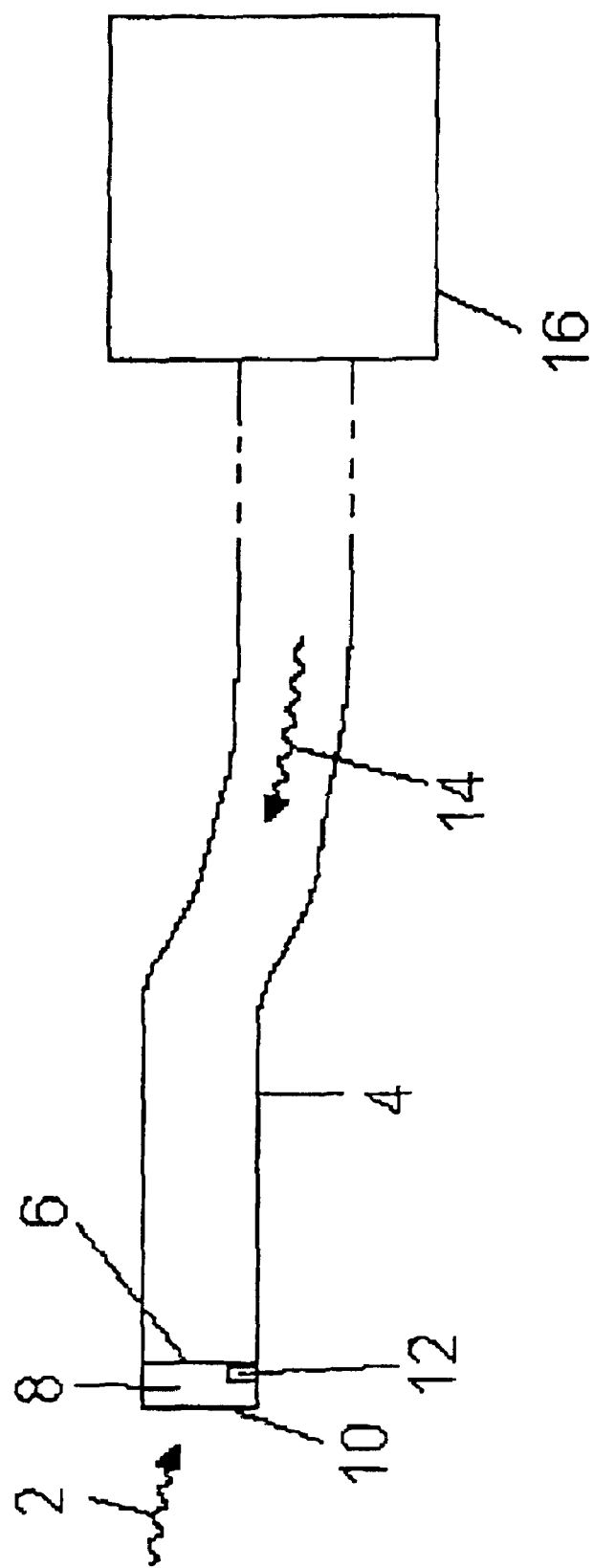

The present invention relates to an interferometer sensor and a method of manufacturing an interferometer sensor. In particular, the present invention relates to a method for forming a polymer film Fabry-Perot interferometer sensor.

A known interferometer comprises a polymer interferometer film, the deflection or compression of which, by a signal for analysis, modulates multiple reflections of an incident optical interrogation signal. For example, a known optical fibre interferometer using a polymer film comprises an optical fibre having a cleaved end and a polymer sensing film butted against the cleaved end. Two opposite faces of the polymer film provide the two reflecting surfaces of the interferometer. Light is introduced to the optical fibre and any external change that causes a variation in the optical thickness of the is sensor film can be detected, since modulation of the thickness of the polymer film influences the output of the interferometer sensor. The external changes could include acoustic waves, quasi-static pressure and temperature variations or thermal waves caused by transient heating.

Conventionally, a disc of PET (polyethylene terepthalate) may be used as the polymer film. The disc is cut from a larger piece of the PET and adhered to the cleaved end of the optical fibre using a conventional adhesive agent. However, high uniformity in the thickness of the polymer film is required, and any irregularities in the surfaces of the PET or a any lack of uniformity in the thickness of the PET can adversely affect the operation of the interferometer. The birefringence of the PET film also has adverse effects on the sensor operation. In addition, the process of cutting out and attaching the PET film to the cleaved end of the optical fibre is complex and time consuming.

Furthermore, the applicant has recognised that the use of an adhesive agent disposed between the inner surface of the PET disc and the cleaved end of the optical fibre can further affect the operation of the interferometer. In particular, due to its finite thickness, the adhesive agent can itself act as an additional interferometer film.

According to a first aspect of the present invention, there is provided a method of forming an interferometer film for an interferometer sensor comprising the step of forming a polymer layer of substantially uniform thickness directly on an interferometer substrate, the layer forming the interferometer film, wherein the polymer layer is deposited by polymerisation of a gas of monomer particles including a para-xylylene.

Since the interferometer film is formed directly onto the surface of the interferometer substrate, there is improved conformity between the two surfaces at the interface between the polymer layer and the substrate. Furthermore, improved uniformity in the thickness of the film can be achieved. Since no layer of adhesive is required to fix the interferometer film to the substrate, adverse interference effects from an adhesive layer are avoided.

Para-xylylene compounds are particularly effective in this application. They offer uniformity and completeness of coverage in addition to good physical, electrical, chemical, mechanical and barrier properties. Furthermore, no solvents are released during the coating process and the process is thus not affected by volatile organic compound (VOC) regulatory restrictions. In addition, the encapsulation provided by para-xylylene is excellent, being free of pin-holes in coatings as thin as 1 $\mu$m.

The coating is formed by the condensation of the monomer gas, preferably under a weak vacuum, molecule by molecule. A comparatively weak vacuum (for example 10 to 20 Pa) means that the monomer gas has a mean free path of around 0.1 cm, enabling the coating to form uniformly on all surfaces, in contrast to other vapour deposition methods such as thermal evaporation or sputtering in which the deposition is line-of-sight. The method of deposition of this aspect of the invention provides good uniformity of thickness, which is an essential requirement for Fabry-Perot sensing interferometers, as they require interferometrically flat surfaces.

The use of a weak vacuum also reduces the likelihood of outgassing of the substrate or other components in deposition chamber.

A wide range of thicknesses of the polymer film can be achieved, for example from 0.025 microns to 75 microns, with high thickness tolerance due to the controllable nature of the process.

Deposition preferably takes place at room temperature, avoiding damage to heat sensitive substrates such as low melting point polymers (eg poly methyl methacylate) or the optical coating on the substrate. It also avoids thermal cycling-induced stresses during deposition process which could damage the substrate or the optical coating on the substrate. Thermally-induced stresses could also lead to the film becoming birefringent which impairs sensor performance.

The method may comprise, prior to the step of polymerising, the step of forming a gas of monomer particles in a first chamber at a first pressure and a first temperature and coupling the gas of monomer particles to a deposition chamber. The substrate is placed in the deposition chamber and, at a second pressure (preferably the weak vacuum) and second temperature (preferably the ambient temperature), monomer particles polymerise on the substrate.

According to a second aspect of the present invention, there is provided an interferometer sensor comprising an interferometer substrate and a parylene polymer film of substantially uniform thickness, in which the parylene film is formed directly on the interferometer substrate.

The invention also provides medical analysis equipment having an interferometer sensor assembly comprising:
an interferometer sensor of the invention;
an interrogation source to provide an interrogation signal to the sensor; and a detector to detect signals received from the sensor.

Figure 2:
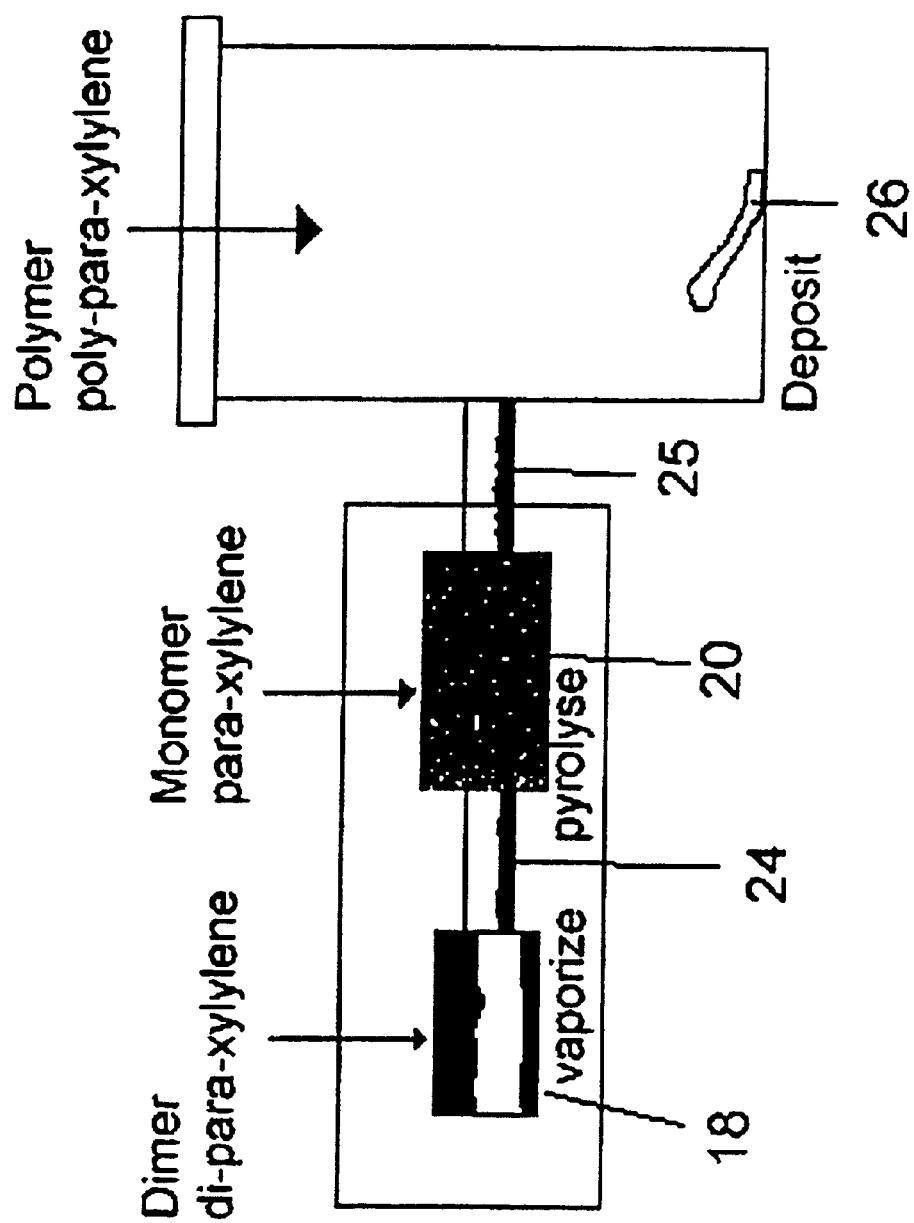

An example of the invention will now be described in detail with reference to the accompanying drawings, in which:

FIG. 1 shows an example of an interferometer including an optical fibre interferometer sensor according to the present invention; and FIG. 2 shows an apparatus suitable for performing a method according to the present invention.

Interferometers are well-known for measuring physical parameters. This invention is particularly directed to a sensor and a method of manufacturing a sensor which operates according to the principles of a Fabry-Perot interferometer. Such a device may be used to study acoustic waves or thermal waves. For the purpose of explanation only, FIG. 1 shows an example of an interferometer including an optical fibre interferometer sensor according to the present invention. Although an interferometer film is shown provided at the end of an optical fibre, the interferometer film may be provided simply on a support substrate with an interferometer interrogation signal being directed through free space to the interferometer substrate.

The interferometer comprises an optical fibre 4 having a cleaved and polished end face 6. Butted against the end face 6 is a polymer film 8 having opposite parallel faces 10, 12 which are at least partially reflective to incident light from a given direction (from right to left in FIG. 1). A light source and detector assembly 16 is provided to supply an optical interrogation signal 14 to the optical fibre 4. The face 12 is partially reflective so that some of the signal 14 is able to penetrate into the polymer film 8, and the face 10 maybe 100% reflective. The reflectivities of the surfaces 10 and 12 may be obtained/controlled by providing a respective reflective coating to each of the surfaces 10 and 12 or by ensuring there is a refractive index mismatch between the optical fibre 4 and the polymer film 8 and between the polymer film and surrounding medium (for example water).

In use, the optical interrogation signal 14 is supplied to the optical fibre 4 and light is reflected from the two faces 10, 12 of the polymer film 8. An incident signal 2, for example containing information about a physical parameter of a sample being analysed, modulates the optical thickness of the film 8 and hence the optical phase difference between the light reflected from the two faces 10, 12. This produces a corresponding intensity modulation of the light reflected from the film 8. As such, information about the sample can be obtained.

In conventional optical fibre polymer film interferometers, an adhesive agent is used to secure film 8 against the cleaved end 6 of the optical fibre 4. The applicant has recognised that this is undesirable since, as described above, the adhesive has a finite thickness and can act as a reflective film itself thereby introducing undesired interference to the detected optical signals. In accordance with the invention, the film is formed directly onto the interferometer substrate, for example the end of an optical fibre, to form a substantially uniform thickness layer of the polymer substance on the substrate. No adhesive is required and as such the output from the interferometer sensor is improved. Furthermore, the polymerised layer does not need to withstand removal from the substrate on which it is polymerised for subsequent attachment to another substrate. Therefore, a polymer can be selected which does not exhibit birefringence problems, and the complexity of manufacture is reduced.

FIG. 2 shows an apparatus suitable for performing the method of the present invention. The apparatus of the invention forms an interferometer sensor using a parylene polymerisation process. The apparatus has an inlet chamber 18, a pyrolysis chamber 20 and a deposition chamber 22 connected by hermetically sealed tubing 24. An optical fibre 26, having an end face to be coated by the parylene, is introduced to the deposition chamber 22 via inlet valve 28. Areas of the optical fibre that are to remain free of coating are masked since the active parylene monomer will polymerise on any available surface.

In use, a dimer parylene precursor is introduced into inlet chamber 18 via tubing where it is vaporised at approximately 150° C. and in a 100 Pa vacuum. The vaporised dimer continues via tubing 24 to the pyrolysis chamber 20 where it is heated to a temperature of approximately 680° C. in a 50 Pa vacuum.

The highly active parylene monomer gas continues via tubing 25 to the deposition chamber 22. The deposition chamber is typically at ambient room temperature and at a weak vacuum pressure, for example having an internal pressure of around 10 Pa. The optical fibre 26 is placed in the deposition chamber 22 with an exposed surface onto which the parylene monomer can polymerise.

The monomer simultaneously condenses, adsorbs and polymerises on all available surfaces to produce a high molecular-weight polymer coating. Due to the chemical properties of para-xylylene and the polymerisation mechanism, the coating formed is conformal and has uniform thickness. In particular, the parylene deposition process does not entrap air since the process is carried out in an effective vacuum. The optical fibre is then removed and demasked and the coating thickness is checked.

There are three common forms of the parylene polymer, parylene C, parylene N and parylene D. Typically, the parylene coating grows at approximately 0.2 $\mu$m per minute for parylene C and a slower rate for parylene N. The polymers each have high hydrophobicity and as such are particularly useful as sensors for medical probe applications.

It is important that the optical fibre being coated is clean and surface contaminants such as oils and ions are removed prior to the coating process. Conventional solvents will be used to perform the cleaning process. Prior to the coating process, a multi-molecular layer of an organo-silane may also be applied to pretreat the parts of the optical fibre that are to be coated. This functions as an adhesion promoter, allowing the polymers to be applied to virtually any vacuum stable material.

The parylene polymerisation process described above involves simultaneous condensation, adsorption and polymerisation of the highly active monomer gas on all available surfaces of the exposed substrate.

The sensor may be used for a variety of applications. As examples, a sensor of the invention may be used for analysing ultrasonic acoustic waves, for medical imaging applications, non-destructive testing of materials, characterisation of industrial ultrasonic processes (for example ultrasonic cleaning or sterilisation processes) or analysing ultrasound source outputs. The sensor may also be used for analysing quasi-static pressure, for example for intra-arterial blood pressure measurement or for pressure measurement in hydraulic systems. The sensor may also be used for analysing quasi-static temperature, for example for temperature measurement during heating of biological tissue. Detection of thermal waves is also possible for biomedical photothermal techniques. The interferometer may also be used for chemical sensing applications, which detect the presence of certain chemicals which are absorbed into the polymer layer, thereby changing the optical thickness. The possible uses of a Fabry-Perot interferometer will be apparent to those skilled in the art.

The parylene deposition process is described in further detail in the article "conformal coating using parylene polymers" in the January/February 1997 issue of medical device technology, publication number 0183, which is incorporated herein by way of reference material.

What is claimed is:

1. A method of forming an interferometer film for an interferometer sensor comprising the step of forming a polymer layer of substantially uniform thickness directly on an interferometer substrate, the layer forming the interferometer film, wherein the polymer layer is deposited by polymerisation of a gas of monomer particles including a para-xylylene.

2. A method according to claim 1, further comprising, prior to the polymerisation, the step of forming a gas of monomer particles in a first chamber at a first pressure and a first temperature and coupling the gas of monomer particles to a deposition chamber.

3. A method according to claim 2, wherein the substrate is placed in the deposition chamber and, at a second pressure and second temperature, monomer particles polymerise on the substrate.

4. A method according to claim 3, wherein the second temperature is the ambient temperature.

5. A method according to claim 2, in which the deposition chamber has an internal pressure of less than 20 Pa.

6. A method according to claim 1, in which the substrate is the cleaved end of an optical fibre.

7. An interferometer sensor comprising an interferometer substrate and a parylene polymer film of substantially uniform thickness, in which the parylene film is formed directly on the interferometer substrate, a partially reflective surface being defined at the interface between the parylene film and the substrate.

8. A sensor according to claim 7, in which the parylene film is formed by a method comprising the step of forming a polymer layer of substantially uniform thickness directly on said interferometer substrate, the layer forming the interferometer film, wherein the polymer layer is deposited by polymerisation of a gas of monomer particles including a para-xylylene.

9. Medical analysis equipment having an interferometer sensor assembly comprising:
    an interferometer sensor according to claim 7;
    an interrogation source to provide an interrogation signal to the sensor; and
    a detector to detect signals received from the sensor.

10. Medical analysis equipment having an interferometer sensor assembly comprising:
    an interferometer sensor according to claim 8;
    an interrogation source to provide an interrogation signal to the sensor; and
    a detector to detect signals received from the sensor.

* * * * *